United States Patent
Jannu et al.

(10) Patent No.: US 7,853,791 B1
(45) Date of Patent: Dec. 14, 2010

(54) SYSTEM AND METHOD FOR CERTIFICATE BASED REDIRECTION

(75) Inventors: Shrikant D. Jannu, Frisco, TX (US);
Richard R. Perez, Euless, TX (US);
Keyang Wang, Richardson, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 1119 days.

(21) Appl. No.: 11/434,674

(22) Filed: May 16, 2006

(51) Int. Cl.
*H04L 29/06* (2006.01)
*H04L 9/32* (2006.01)
*G06F 9/00* (2006.01)

(52) U.S. Cl. .................. 713/175; 713/156; 713/172; 726/12

(58) Field of Classification Search .......... 713/156, 713/172, 175; 726/12
See application file for complete search history.

(56) References Cited

U.S. PATENT DOCUMENTS

| | | | |
|---|---|---|---|
| 6,510,464 B1 * | 1/2003 | Grantges et al. | 709/225 |
| 7,124,294 B2 * | 10/2006 | Kawamura et al. | 713/156 |
| 7,591,008 B2 * | 9/2009 | Nalliah et al. | 726/10 |
| 2001/0044894 A1 * | 11/2001 | Saito et al. | 713/156 |
| 2003/0196084 A1 * | 10/2003 | Okereke et al. | 713/156 |
| 2006/0005237 A1 * | 1/2006 | Kobata et al. | 726/12 |
| 2006/0174106 A1 * | 8/2006 | Bell et al. | 713/156 |
| 2006/0233160 A1 * | 10/2006 | Kawanishi et al. | 370/352 |
| 2007/0005965 A1 * | 1/2007 | Nalliah et al. | 713/168 |

* cited by examiner

*Primary Examiner*—Nasser Moazzami
*Assistant Examiner*—Mohammad W Reza

(57) ABSTRACT

A system for digital certificate direction is provided. The system includes an application server having one or more applications and a user computer. The system also includes a certificate optional server that is operable to communicate with the user computer regarding access to the one or more applications. The certificate optional server is operable, when the user computer communication is associated with a digital certificate, to direct the user computer to a digital certificate mandated computer to promote access to the one or more applications. When the user computer communication is not associated with the digital certificate, the certificate optional server is operable to direct the user computer to a certificate generator.

18 Claims, 4 Drawing Sheets

SYSTEM AND METHOD FOR CERTIFICATE BASED REDIRECTION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to digital certificates, and more particularly, but not by way of limitation, to a system and method for certificate based redirection.

BACKGROUND OF THE INVENTION

A digital certificate is electronic information associated with a user computer and with the communications and the signals from the user computer, whereby the digital certificate establishes the credentials of a computer and/or the user of the computer who communicates or sends a signal from the user computer. The digital certificate may include, for example, the name of the computer user, a serial number, an expiration date, a copy of an encryption key for the computer user to encrypt communications, and a digital signature of a digital certificate registration authority. A digital certificate registration authority is an entity that instructs a digital certificate generator to generate a digital certificate for a computer user.

SUMMARY OF THE INVENTION

In one embodiment, a system for digital certificate direction is provided. The system includes an application server having one or more applications and a user computer. The system also includes a certificate optional server that is operable to communicate with the user computer regarding access to the one or more applications. The certificate optional server is operable, when the user computer communication is associated with a digital certificate, to direct the user computer to a digital certificate mandated computer to promote access to the one or more applications. When the user computer communication is not associated with the digital certificate, the certificate optional server is operable to direct the user computer to a certificate generator.

In another embodiment, a computer implemented method for certificate redirection is provided. The method includes determining whether an attempt to communicate with an application is associated with a digital certificate. The method includes, when the communication is associated with the digital certificate, directing the communication to a digital certificate mandated computer to promote access to the application. The method includes, when the communication is not associated with the digital certificate, directing the communication to a certificate generator. The method also includes, when the communication is not associated with the digital certificate and is associated with an alternate security computer, directing the communication to the alternate security computer.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

Figure 1:
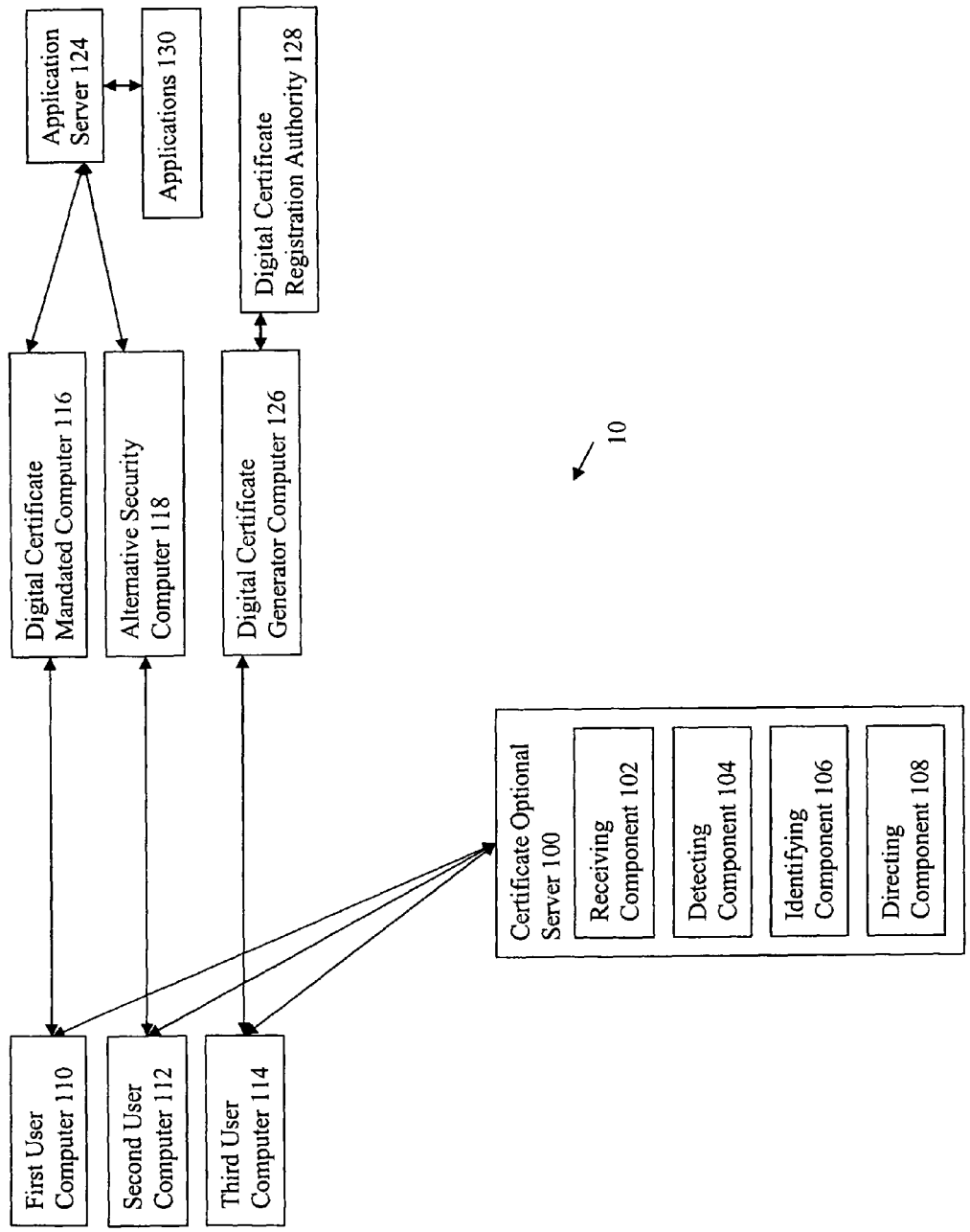
FIG. 1 is a block diagram of a system for certificate based redirection according to one embodiment of the present disclosure.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

A digital certificate mandated computer is a secure computer that requires signals or communication from other initiating systems to be associated with a valid digital certificate as a prerequisite to communication. For example, if the digital certificate mandated server receives a communication associated with a digital certificate, the server communicates and responds accordingly. If however, the communication does not include a digital certificate, the digital certificate mandated server may not respond or may respond in a manner that is unfamiliar to the initiating system, causing a communication failure. A user of such initiating system may be unaware that the reason for the communication failure is that the initiating system or user computer does not have a digital certificate.

The following example illustrates embodiments of the present invention relative to telecommunications providers, however the present system is not so limited and may be applied to any systems, as will be readily apparent to one skilled in the art. More specifically, but not by way of limitation, some applications may be secured on digital certificate mandated servers. These applications may be software and/or graphical user interfaces that enable or promote establishing, for example, wireless telecommunications service for new customers. A vendor or reseller of wireless or other telecommunications service may require access to the telecommunications provider's information technology (IT) systems and applications to establish, for example, new customer accounts, and/or address other customer service issues. Where the telecommunications provider's applications are maintained on digital certificate mandated servers, the vendor's computers require digital certificates in order to access the applications. If, however, the vendor has multiple computers and attempts to access the telecommunication provider's application from a computer that does not have a digital certificate, the digital certificate mandated server may reject the communication attempt without providing any information to the user about the reasons for the failure. Such a scenario may be unsatisfactory for the telecommunications provider, because the vendor might be unable to assist the customer with their problem or the vendor might become frustrated and instead sell the customer products and services of another telecommunications provider.

The present disclosure, according to one embodiment provides a certificate optional server that may receive the communication from, for example, the vendor. If the communication includes a digital certificate, the certificate optional server redirects the computer to a server that uses a digital certificate, such as a certificate mandated server. The user or vendor may then access the desired application. If however, the vendor or other computer user attempts to connect using a computer that does not have a digital certificate, the certification optional server is capable of redirecting the communication to another system that may assist the computer and/or user in obtaining a digital certificate. Also, the certificate optional server might identify the computer as not having a digital certificate, but still being associated with a vendor or preferred user. In this case, the certificate optional server might redirect the communication to systems that might not require a digital certificate, but might still provide secure access to the application via another or alternate security systems.

Turning now to FIG. 1, an exemplary system 10 for certificate based redirection is depicted. The system includes a certificate optional server 100 that promotes communications with applications on application servers, such as application server 124. The certificate optional server 100 includes a receiving component 102, a detecting component 104, an identifying component 106, and a directing component 108. Although illustrated separately, these components 102, 104, 106, and 108 may be associated or combined with one another in various combinations. The receiving component 102 is an object or program that receives signals from one or more user computers, such as a first, second, and third user computers 110, 112, 114. The user computers may be users or systems, for example, attempting to access secure applications.

The detecting component 104 is an object or program that detects whether signals or communications from the user computers are associated with digital certificates. The identifying component 106 is an object or program that identifies whether a user computer is associated with a vendor or a preferred system, for example. When the user computer does not have an associated digital certificate, but is associated with a preferred system, the certificate optional server 100 may promote access to the application using, for example, an alternative security computer 118. The directing component 108 is an object or program that redirects the user computers to the appropriate systems.

Although only three user computers, the first, second, and third user computers 110, 112, and 114, are shown, any number may be present. The system 10 depicts two secure computers, a digital certificate mandated computer 116 and the alternative security computer 118, but other numbers could be present. The alternative security computer 118 is a computer that does not require digital certificates for secure communications. A secure computer may be any computer operable to promote secure communications. The system 10 also depicts a digital certificate generator computer 126 and a digital certificate registration authority 128. The digital certificate generator computer 126 may be any system or process or combination of systems and processes to assist user computers in obtaining digital certificates. A digital certificate registration authority 128 may register and approve digital certificate requests from user computers. The digital certificate registration authority 128 may also instruct the digital certificate generator computer 126 to generate a digital certificate for a user computer that did not previously have a digital certificate.

The first user computer 110, for example, may have a digital certificate and attempts to establish communication with the application server 124. In this embodiment, attempts to communicate with the application server 124 are initially directed to the certificate optional server 100. For example, the user computers might be directed to the Uniform Resource Locator (URL) of the certificate optional server 100. The certificate optional server 100 detects the associated digital certificate and redirects the first user computer 110 to the digital certificate mandated computer 116. When the directing component 108 redirects the user computers, this may be accomplished, for example, by a URL redirection. The digital certificate mandated server 116 validates the digital certificate. The first user computer 110 may then access applications on the application server 124.

The second user computer 112 may not have a digital certificate, but may be associated with a preferred vendor or the alternate security computer 118. In this case, the certificate optional server 100 determines that the second user computer 112 does not have a digital certificate, but is associated with the preferred vendor. User computers might be identified as associated with preferred or selected vendors, for example, by the Internet Protocol (IP) address of the requesting computer. Any communication received that falls within a given range or block of IP addresses, might be identified as being associated with preferred user computers and directed to the alternate security computer 118. This is only one example, and other methods of identifying preferred user computers may be used and will readily suggest themselves to one skilled in the art.

The certificate optional server 100 then redirects the second user computer 112 to the alternate security computer 118. The alternate security computer 118 might have a user interface that allows the users of computers to validate and authorize themselves using convention techniques, such as by entering a user name and password. The alternate security computer 118 would then enable access to the application server 124 and requested applications 130.

The third user computer 114 may not have a digital certificate. In which case, the certificate optional server 100 redirects the third user computer 114 to the digital certificate generator computer 126 for the third user computer 114 to obtain a digital certificate.

Figure 2:
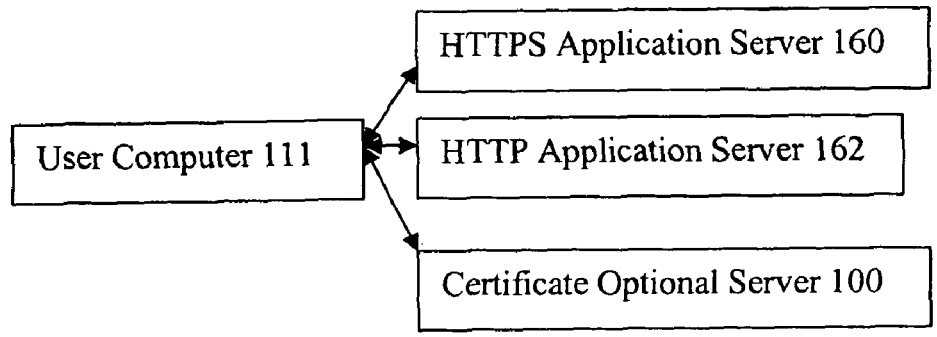
FIG. 2 is a block diagram of another embodiment of certificate based redirection.

FIG. 2 illustrates another embodiment of the system 10 for certificate based redirection. A user computer 111, such as the user computers discussed above, attempts to communicate with an application. In this embodiment, the certificate optional server 100 again redirects the user computer 111 based on whether the user computer 111 has a valid digital certificate. In this embodiment, the application may be provided on different application servers. An HTTPS application server 160 is a server that communicates using Hypertext Transport Protocol (HTTP) with the trailing "S" denoting that the HTTP communication is secured using an encrypted secure socket layer (SSL) or transport layer security (TLS) transport mechanism. The HTTPS application server 160 requires a digital certificate. Therefore when the user computer 111 has a digital certificate, the certificate optional server 100 redirects the user computer 111 to the HTTPS application server 160 to access the application.

An HTTP application server 162 does not require a digital certificate, but might require that the user of the user computer 111 validate manually, such as by using a user name and password or other well known techniques. Once validated, the application would be accessible to the user computer 111 via the HTTP application server. This embodiment might require that two separate versions of the application be created and maintained, one on each of the different application servers 160, 162. Due to the added administration, this may not be the most preferred option.

Figure 3:
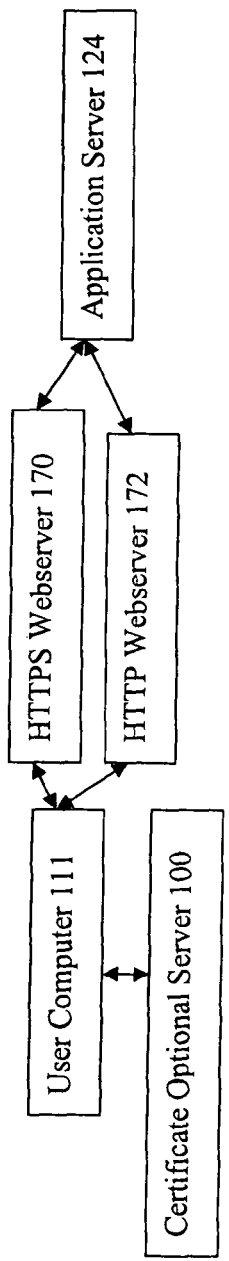
FIG. 3 is a block diagram of still another embodiment of certificate based redirection.

FIG. 3 illustrates another embodiment of the system 10 for certificate based redirection. In this embodiment, the certificate optional server 100 redirects the user computer 111 based on whether the communication includes a digital certificate. An HTTPS web server 170 is provided for communicating with the user computer 111 when the user computer 111 has a digital certificate. The HTTPS web server 170 then enables access to the application server 124. An HTTP web server 172 is provided for validating the user computer 111 when the user computer does not have a digital certificate. Once validated, such as by entering a user name and password, the HTTP web server 172 enables communication between the user computer 111 and the application server 124. It can be seen that in this embodiment, the same application is used by the user computer 111 regardless of whether or not the user computer 111 has a digital certificate.

Figure 4:
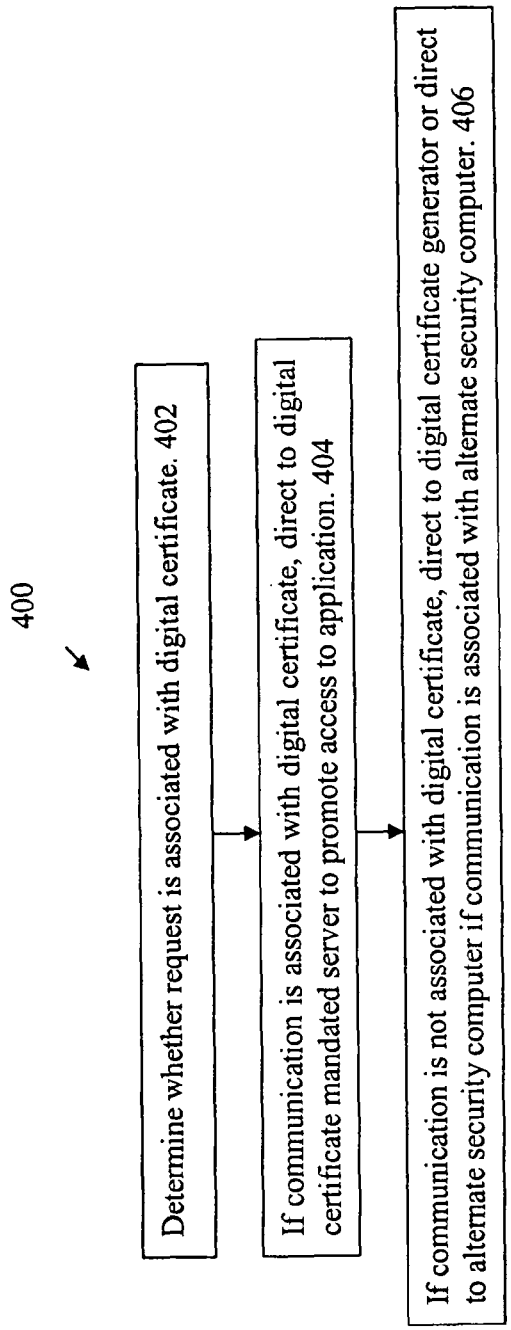
FIG. 4 is a flowchart of a method for certificate based redirection, according to embodiments of the present disclosure
Figure 5:
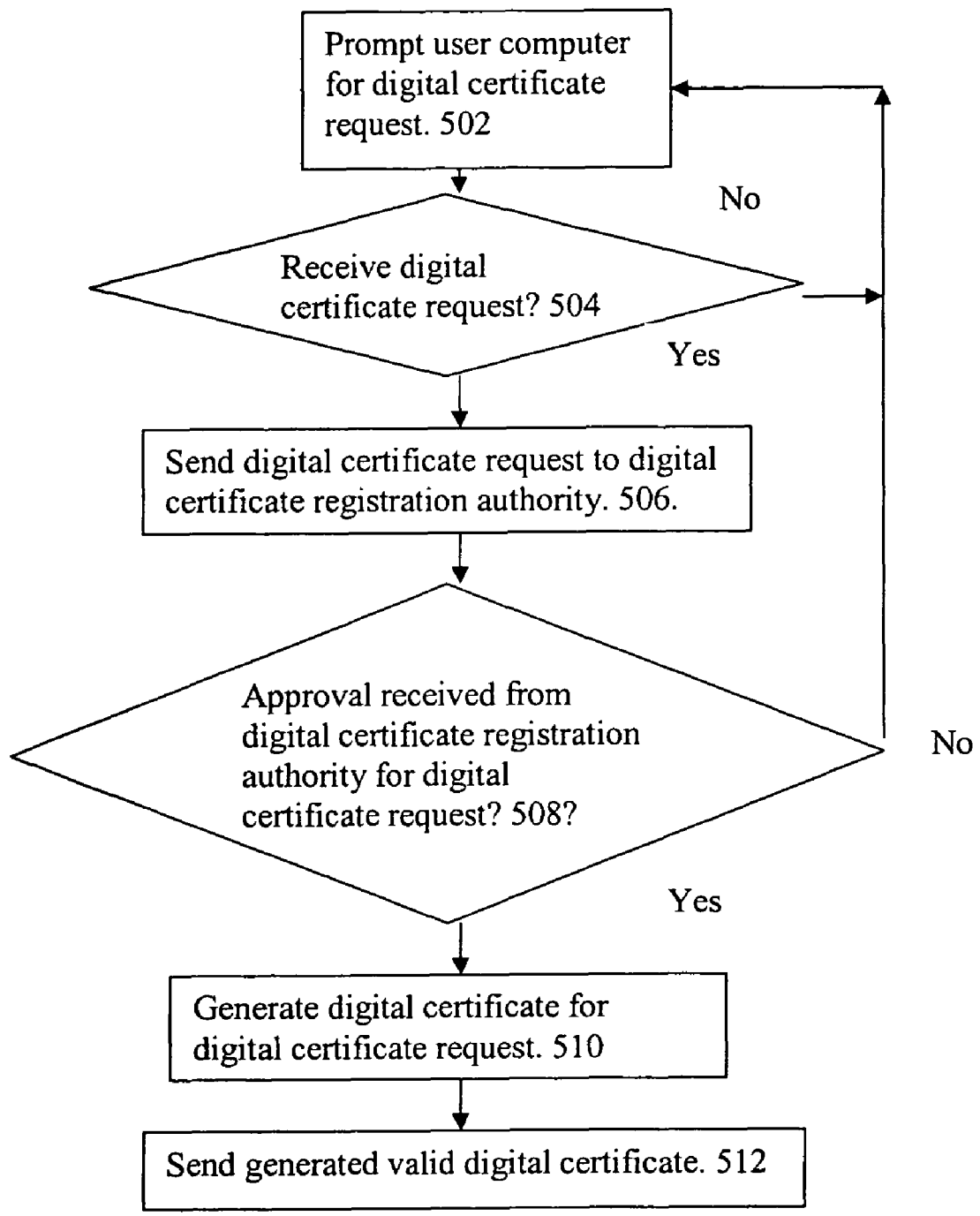
FIG. 5 is a flowchart of a method for digital certificate generation according to an embodiment of the present disclosure.

FIG. 4 illustrates one embodiment of a computer implemented method 400 for certificate redirection. In box 402, the method provides for determining whether an attempt to communicate with an application is associated with a digital certificate. In box 404, when the communication is associated with the digital certificate, the method provides for directing the communication to a digital certificate mandated computer to promote access to the application. In box 406, when the communication is not associated with the digital certificate, the method provides for directing the communication to a certificate generator. Where the communication is not associated with the digital certificate and is associated with an alternate security computer, the method provides for directing the communication to the alternate security computer FIG. 5 depicts a flowchart of a method 500 for the digital certificate generator computer 126 responding to the certificate optional server 100 according to an embodiment of the present disclosure. The method depicted in FIG. 5 is may be executed when the user computer does not have a digital certificate and the certificate optional server 100 has directed the user computer to the digital certificate generator computer 126. In box 502, the digital certificate generator computer 126 prompts the user computer for a digital certificate request. In box 504, the digital certificate generator computer 126 determines whether the digital certificate generator computer 126 receives the digital certificate request from the user computer. The request may include completing an application and providing information about the user and user computer. In box 504, if the digital certificate generator computer 126 receives the digital certificate request from, for example, the third user computer 114, the method proceeds to box 506. In response to a determination that the digital certificate generator computer 126 does not receive the digital certificate request from the user computer, the method returns to box 502.

In box 506, the digital certificate generator computer 126 sends the digital certificate request to the digital certificate registration authority 128. The digital certificate registration authority 128 may process the digital certificate request using human intervention in order to determine whether or not to approve the digital certificate request. For example, if the digital certificate request lists information such as the name of the supervisor for the computer user who is requesting the digital certificate, the digital certificate registration authority 128 may instruct individuals associated with the digital certificate registration authority 128 to contact the listed supervisor. The individuals associated with the digital certificate registration authority 128 might contact the listed supervisor to confirm that the listed supervisor approves the request for the digital certificate for the user.

In box 508, the digital certificate generator computer 126 determines whether approval is received from the digital certificate registration authority 128 for the digital certificate request. In response to receiving approval, the method proceeds to box 510. For example, if the digital certificate registration authority 128 approves the digital certificate request for the third user computer 114, the method proceeds to box 510. In response to a determination that approval is not received from the digital certificate registration authority 128 for the digital certificate request, the method returns to box 502. 502. In box 510, the digital certificate generator computer 126 generates the digital certificate.

In box 512, the digital certificate generator computer 126 sends the generated digital certificate to the user and/or user computer that requested the digital certificate. The digital certificate generator computer 126 may send the generated digital certificate using any method. For example, the digital certificate generator computer 126 may use postal mail to send the generated digital certificate directly to the computer user that requested the digital certificate. The digital certificate generator computer 126 also has the option of using electronic mail to send the generated digital certificate to the user computer, which requested the digital certificate.

Figure 6:
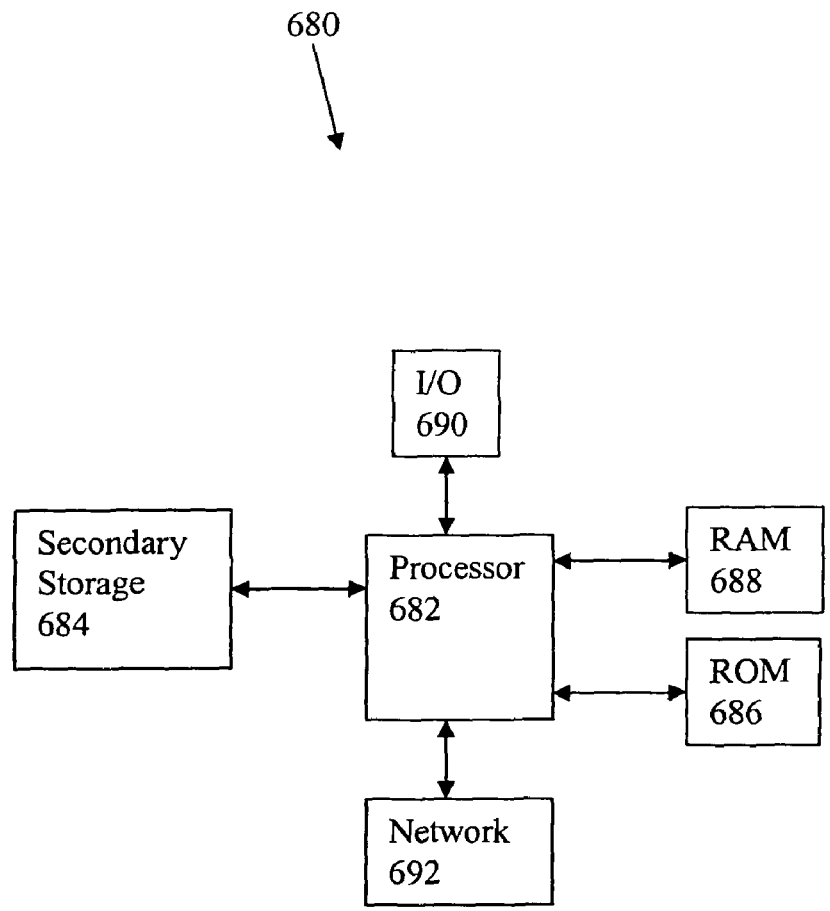
FIG. 6 illustrates an exemplary general purpose computer system suitable for implementing the several embodiments of the disclosure.

The systems and methods described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) 690 devices, and network connectivity devices 692. The processor may be implemented as one or more CPU chips.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage. The RAM 688 is used to store volatile data and perhaps to store instructions. Access to both ROM 686 and RAM 688 is typically faster than to secondary storage 684.

I/O 690 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 692 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 692 devices may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity 692 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system for digital certificate based redirection, comprising:
    an application server configured to enable a preferred user computer to access one or more applications wherein the preferred user computer is pre-associated with a preferred vendor;
    a digital certificate mandated computer configured to promote the preferred user computer to access the one or more applications from the application server when communications from the preferred user computer are associated with a digital certificate;
    an alternative security computer configured to promote the preferred user computer to access the one or more applications from the application server when communications from the preferred user computer are not associated with a digital certificate and are associated with an alternate security credential; and
    a certificate optional server configured to communicate with the preferred user computer regarding access to the one or more applications;
    the certificate optional server further configured to direct the preferred user computer to the digital certificate mandated computer to promote the preferred user computer to access the one or more applications from the application server when communication from the preferred user computer to access the one or more applications is associated with a digital certificate;
    the certificate optional server further configured to direct the preferred user computer to the alternate security computer to promote the preferred user computer access to the one or more applications from the application server when communication from the preferred user computer to access the one or more applications is not associated with a digital certificate and is associated with an alternate security credential; and
    the certificate optional server further configured to direct the preferred user computer to a certificate generator to obtain a digital certificate in order to promote the preferred user computer to access the one or more applications from the application server when communication from the preferred user computer to access the one or more applications is not associated with a digital certificate and is not associated with an alternate security credential.

2. The system of claim 1, wherein the certificate optional server is operable to redirect the user computer to one of the digital certificate mandated server, the certificate generator server, or the alternate security computer.

3. The system of claim 2, wherein the redirection include redirecting the user computer to a different Uniform Resource Locator (URL).

4. The system of claim 1, wherein the certificate optional server is operable to determine whether the user computer communication is associated with a digital certificate.

5. The system of claim 1, wherein the certificate generator is further defined as including a process to obtain digital certificates.

6. The system of claim 1, wherein the digital certificate generator computer is operable to promote:
    receiving the request for a digital certificate from the user computer;

obtaining approval from a digital certificate registration authority for the digital certificate; and generating the digital certificate for the user computer.

7. The system of claim 6, wherein the digital certificate generator computer is further operable to send the generated digital certificate to the user computer.

8. The system of claim 1, wherein the digital certificate mandated computer and the alternative security computer are operable to direct the user computer to the application server.

9. A computer implemented method for certificate redirection, comprising:

determining, by a certificate optional server, whether an attempt by a user computer to communicate with an application stored in a pre-specified system is associated with a digital certificate, is not associated with a digital certificate and is associated with an alternate security credential, or is not associated with a digital certificate and is not associated with an alternate security credential and is from a preferred user computer, wherein a user computer that is pre-associated with a preferred vendor is considered a preferred user computer;

directing, by the certificate optional server, the communication of the user computer to a digital certificate mandated computer to promote access to the application stored in the pre-specified system based on determining that the communication is associated with a digital certificate;

directing, by the certificate optional server, the communication of the user computer to an alternate security computer to promote access to the application stored in the pre-specified system based on determining that the communication is not associated with a digital certificate and the communication is associated with an alternate security credential; and directing the communication of the user computer to a digital certificate generator computer to obtain a digital certificate in order to promote access to the application stored in the pre-specified system based on determining that the communication of the user computer is not associated with a digital certificate, the communication is not associated with an alternate security credential, and the communication is from a preferred user computer.

10. The computer implemented method of claim 9, wherein directing the user computer to the digital certificate mandated computer and directing the user computer to the alternative security computer includes redirecting using uniform resource locators.

11. The computer implemented method of claim 9, wherein the digital certificate mandated computer and the alternative security computer are application servers maintaining the application.

12. The computer implemented method of claim 11, wherein the digital certificate mandated computer is an application server employing Hyper-text Transfer Protocol Secure (HTTPS) and maintaining the application, and wherein the alternative security computer is an application server employing Hyper-text Transfer Protocol (HTTP) and maintaining the application.

13. The computer implemented method of claim 12, wherein the digital certificate mandated computer and the alternative security computer maintain one of different versions of the application and the same application.

14. The computer implemented method of claim 9, further comprising:

when the communication is associated with the digital certificate, directing the communication to a Hyper-text Transfer Protocol Secure (HTTPS) web server to promote access to an application server maintaining the application; and when the communication is not associated with the digital certificate and is associated with an alternate security computer, directing the communication to a Hyper-text Transfer Protocol (HTTP) web server to promote access to the application server maintaining the application.

15. The computer implemented method of claim 9, wherein when the communication is not associated with the digital certificate and the communication is directed to the certificate generator, the method further comprises obtaining approval from a digital certificate registration authority for the digital certificate.

16. The computer implemented method of claim 15, wherein when the communication is not associated with the digital certificate and the communication is directed to the certificate generator, the method further comprises generating the digital certificate for the user computer.

17. The computer implemented method of claim 16, wherein when the communication is not associated with the digital certificate and the communication is directed to the certificate generator, the method further comprises sending the generated digital certificate.

18. The computer implemented method of claim 9, wherein whether the communication includes the digital certificate is determined by a certificate optional server.

* * * * *